United States Patent [19]

Aronson

[11] 4,074,021

[45] Feb. 14, 1978

[54] HIGH DISCHARGE BATTERY WITH DEPOLARIZED PLATES

[75] Inventor: Robert R. Aronson, West Bloomfield, Mich.

[73] Assignee: Electric Fuel Propulsion Corporation, Detroit, Mich.

[21] Appl. No.: 733,842

[22] Filed: Oct. 19, 1976

Related U.S. Application Data

[63] Continuation of Ser. No. 584,498, June 6, 1975, abandoned, which is a continuation-in-part of Ser. No. 385,324, Aug. 3, 1973, Pat. No. 3,928,080, which is a continuation of Ser. No. 26,218, April 7, 1970, abandoned.

[51] Int. Cl.$^2$ .................................. H01M 2/38
[52] U.S. Cl. .................................. 429/51; 429/67; 429/139
[58] Field of Search .................. 429/67–70, 429/50, 51, 136–139, 71–89

[56] References Cited

U.S. PATENT DOCUMENTS

| | | | |
|---|---|---|---|
| 712,178 | 10/1902 | Chamberlain | 429/136 X |
| 901,322 | 10/1908 | Busch | 429/138 |
| 2,921,111 | 1/1960 | Crowley et al. | 429/67 X |
| 2,932,681 | 4/1960 | Solomon | 429/67 |
| 2,934,585 | 4/1960 | Zahn | 429/139 |
| 3,476,612 | 11/1969 | Tench | 429/139 |
| 3,615,838 | 10/1971 | Erickson | 429/35 |
| 3,703,417 | 11/1972 | Rosa et al. | 429/139 |
| 3,799,809 | 3/1974 | Bohm et al. | 429/39 |

Primary Examiner—Charles F. LeFevour
Attorney, Agent, or Firm—Cushman, Darby & Cushman

[57] ABSTRACT

A battery preferably for use as a power source in an electrical vehicle includes a plurality of envelope separators for reducing the concentration of waste products at the surface of the battery plates. The envelope separators comprise two thin sheets of microporous material which are bonded together at their edges and placed between each of the plates of the battery. The envelope separators while being nonconductive are highly porous thereby allowing electrical current to pass from one plate to the other through the separators in the electrolytic solution of the battery. The electrolyte is pumped into each envelope separator under pressure and is forced out through the pores or small holes in the sides of the envelope to flush water, gas and loose particles of active material away from the plates of the battery. By forcing the electrolyte against the plates of the battery, the concentration or specific gravity of the electrolyte at the surface of the plates is increased, thereby increasing battery efficiency.

17 Claims, 3 Drawing Figures

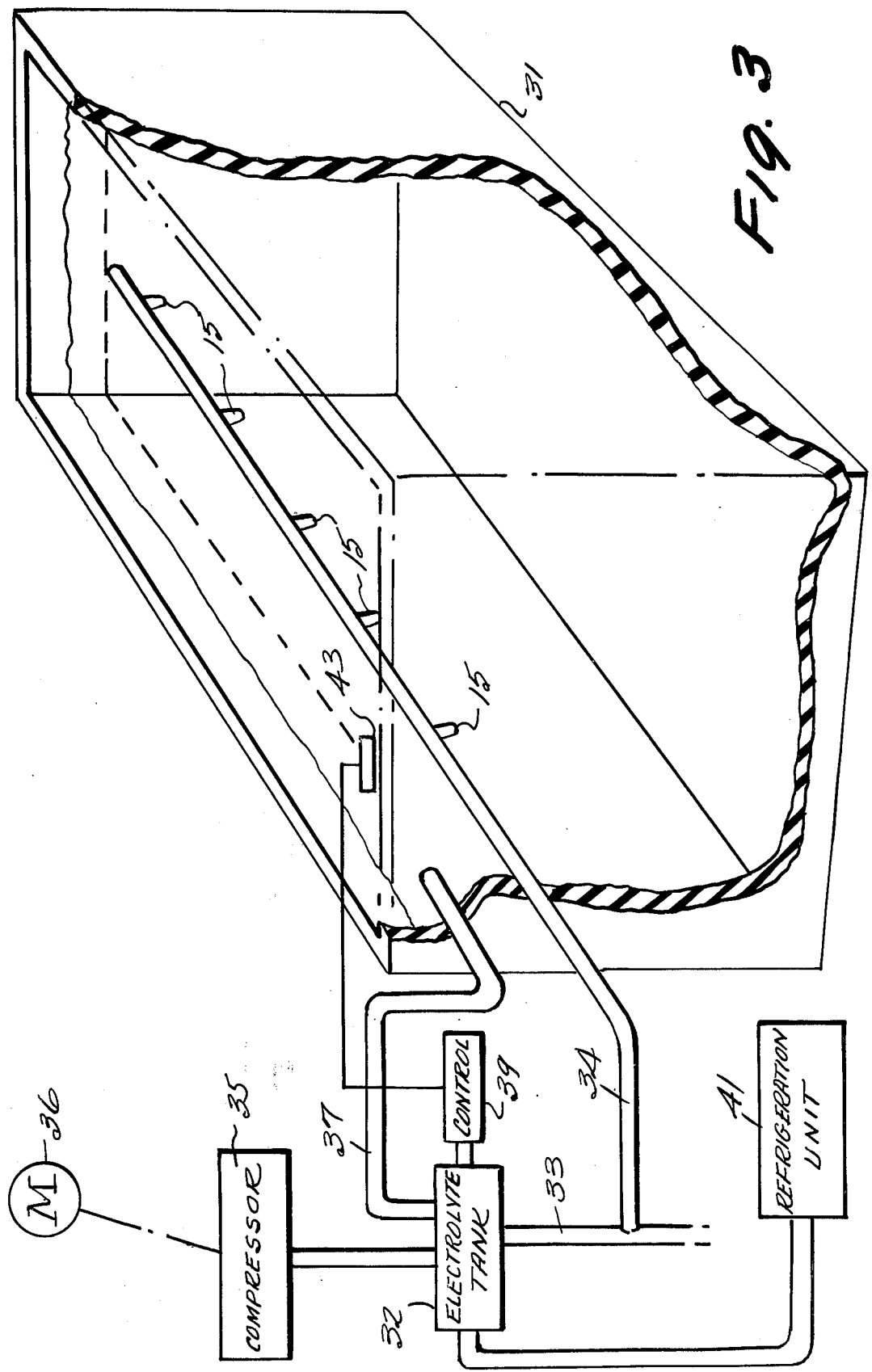

HIGH DISCHARGE BATTERY WITH DEPOLARIZED PLATES

BRIEF DESCRIPTION OF THE PRIOR ART AND SUMMARY OF THE INVENTION

This is a continuation of application Ser. No. 584,498 filed June 6, 1975, now abandoned the entire specification and claims of which are hereby incorporated by reference, 584,498 is a continuation-in-part application of copending patent application, Ser. No. 385,324, filed Aug. 3, 1973, now U.S. Pat. No. 3,928,080 which in turn is a continuation of application Ser. No. 26,218, filed Apr. 7, 1970, now abandoned. The disclosure of these applications is incorporated herein by reference.

At the beginning of the 20th century, electricity, steam and combustible fluids, such as gasoline, were the three potential sources of energy for automobiles. For many reasons, including the failure of the advocates of steam and electricity to produce power sources which were capable of driving an automobile reliably at high speeds and over reasonable distances and which were capable of being quickly replenished, gasoline driven, internal combustion engines soon eclipsed all other power sources and a major portion of the time and energy of the automobile industry since that time has been spent in improving the internal combustion engine.

Recently, it has become increasingly apparent that the gasoline driven automobile, despite its contribution to technology and culture, has also provided a number of extraordinarily difficult problems which are not susceptible to simple solutions. Among these problems, are the thermal, noise and atmospheric pollution which result from the use of gasoline driven automobiles. Such pollutants are the necessary byproducts of the combustion of gasoline and cannot ever be entirely eliminated. Moreover, it is becoming increasingly apparent that oil supplies in the world are limited, and must to an extent be conserved.

As a result, the electrically powered automobile, which was bypassed as a practical vehicle many decades ago, has been increasingly considered as a feasible alternative to the gasoline driven automobile, and as a solution to many of the problems generated by such automobiles. Since an electrical automobile powered by batteries does not require burning a fluid, no heat or combustion by-products are produced and moreover, electrical vehicles can be operated extremely quietly and efficiently. Further, while energy is, of course, required to move the electrical vehicle, just as it is required to move the gasoline driven vehicle, and energy is also required to generate the electricity, the original generating energy can be derived from sources which do not need to be conserved as do oil supplies. Generation of electricity from solar and nuclear plants, as well as hydroelectrical plants, can provide usable energy, without at the same time decreasing our limited and irreplaceable oil resources.

Unfortunately, there was in the years in which the gasoline engine was being developed no corresponding emphasis on developing an electrically powered vehicle and particularly on developing a reliable source of electricity which would be sufficiently compact to replace a gasoline engine and at the same time contain sufficient energy and be rechargeable quickly enough to be competitive with gasoline engines. Conventional lead acid batteries, which have been used to supply energy to initiate combustion in gasoline engines and to provide electricity for various other functions in automobiles, are not substantially different from similar batteries used at the beginning of the 20th century. Since only a small electrical capacity is required in gasoline driven vehicles, there is no particular necessity either to minimize battery weight and size or to maximize efficiency in using the electrical energy produced. However, when such a battery or batteries must alone supply all the energy needed to move a vehicle along the surface of the earth, then the problems of battery weight, size and efficiency assume the greatest import.

One of the major problems in all batteries having an electrolyte surrounding metallic plates is that during the chemical reaction which accompanies the production of electricity the waste products of the reaction tend to concentrate on the surface of the plates and insulate the electrolyte from the plates. If the energy production is slow enough, such waste products, of course, eventually diffuse throughout the electrolyte, and energy production continues until the waste concentration exceeds a given level or the reactants are totally consumed. However, when the battery is discharging at a high rate, these waste products, which usually include water, accumulate on the surface and in the pores of the positive plates and eventually insulate them plates from the electrolyte at which time the battery ceases to produce electricity even though it is not fully discharged. Thus, for example, an electrical car of conventional type and with conventional batteries can be driven for 120 miles at 30 miles an hour, but only 60 miles at 60 miles an hour. Of course, after this 60-mile distance, if the water accumulation at the positive plate is given a chance to diffuse through the electrolyte, the vehicle can then be driven for a short distance before the waste products again insulate the plates and reduce the current generating capability of the battery.

It therefore is an object of this invention to provide a means for flushing waste products away from the battery plates to thereby improve the efficiency of the battery.

SHORT STATEMENT OF THE INVENTION

Accordingly, this invention relates to a method and apparatus for reducing the concentration of waste products on the surface of battery plates and for increasing the concentration of the electrolyte in the area proximate the plates. The apparatus includes a plurality of envelope separators each comprised of a pair of thin microporous sheets of material bonded together at their edges and positioned between each of the battery plates. The electrolyte is pumped into each envelope under pressure and is forced out through the pores in the sides of the separator to flush away water, gas and loose particulate matter on or near the battery surface. By forcing the electrolyte against the plates of the battery, the concentration of the electrolyte at the surface of the plates is increased, thereby enhancing the efficiency of the battery.

BRIEF DESCRIPTION OF THE DRAWINGS

Other objects, features and advantages of this invention will become more fully apparent from the following detailed description, appended claims and accompanying drawings in which

FIG. 3 is a cut-away perspective view of the battery of this invention illustrating schematically the control mechanism for operating the battery system.

DETAILED DESCRIPTION OF THE PREFERRED EMBODIMENT

As previously mentioned, one of the more perplexing problems with conventional electrolyte-plate batteries is that during discharge waste products, such as water, form at the surface of the positive plates which products gradually diffuse throughout the electrolyte. However, if formed quickly enough because of a large energy demand on the battery, such waste products become concentrated around the plates and effectively insulate the plates from the electrolyte. This insulation in effect prevents further chemical reaction within the battery and prevents further production of electrical power by the battery.

With a lead cobalt battery, the waste product is primarily water and the porous plates, which are conventionally used, hold this water like a sponge so that, as the water accumulates, the capacity of the battery decreases. When the concentration of water in and around the plates reaches a certain level, the battery appears to be discharge. However, if the battery is allowed to stand for a minimum of 15 or 20 minutes, it displays a bounce-back capability which results from the uniform diffusion of the water throughout the electrolyte. Thus, the battery is again capable of producing electrical power.

As an example, it has been found that an electrical car operating normally at 120 volts on conventional 300 ampere-hour batteries can be driven 60 to 70 miles at 60 miles an hour before the current output of the batteries drops rapidly to zero. If the batteries are left undisturbed for a half hour or so, the car can then be driven an additional 6 or 7 miles. After a wait of 2 more hours, a trip of 5 more miles can be taken. However, if the same car is driven at 30 miles an hour with a consequentially reduced power demand and lower rate of discharge, the car can be driven approximately 120 miles without stopping. In view of the fact that high discharge rates are frequently desirable and necessary in electrical vehicles, the present invention provides a means for permitting the rapid discharge of energy from a battery without the attendant build-up of waste products in and around the battery plates. This is achieved by continuously flushing the electrolyte against the plates to carry away waste products as they are produced and thereby assist the diffusion of such waste products throughout the electrolyte.

Figure 1:
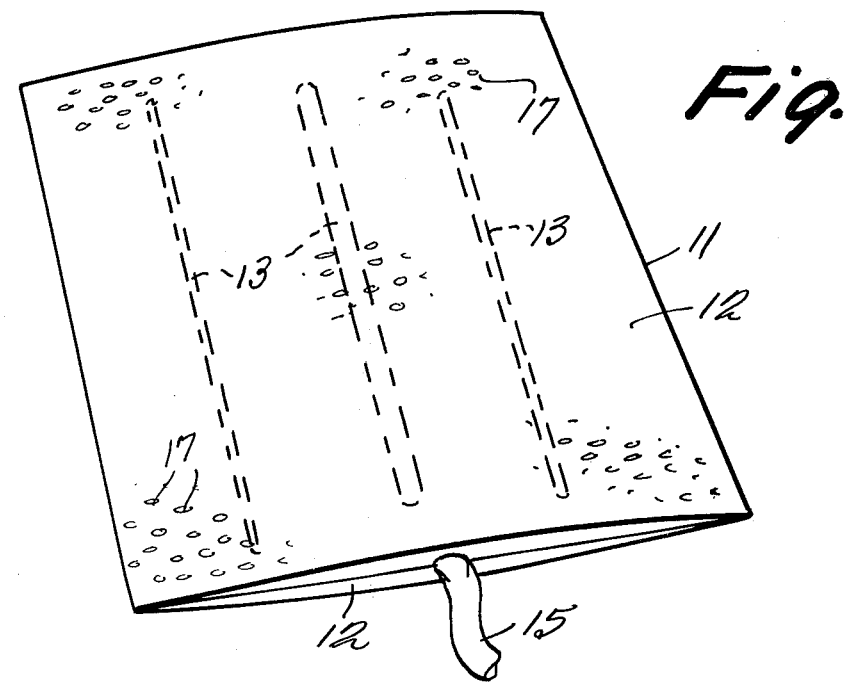
FIG. 1 is a perspective view of an envelope separator for depolarizing the battery of this invention.

Refer now to FIG. 1 where there is shown a perspective view of an envelope separator 11 which is utilized to flush away water and other waste materials from the surface of the battery plates and which, in addition, forces the electrolyte against the surface of the battery plates for increasing the efficiency thereof. As illustrated the envelope separator 11 is comprised of a pair of thin microporous sheets of material 12 which are bonded together at their edges by any one of a number of suitable techniques known in the art. The sheets may consist of microporous rubber, plastic, fiberglass or other similar materials which are nonconductive but yet very highly porous. The electrolytic solution must be capable of freely passing through the sheets of membrane 12 to thereby allow an electrical current to pass from one plate of the battery to the other through the envelope separator in an electrolytic solution. Ribs 13 are positioned vertically between the sheets 12 to provide a means for separating the two sheets. A small plastic tube 15 for conducting electrolyte is inserted into the envelope separator at one end thereof where the sheets 12 are bonded and is secured to the separator in a known manner so as to form a water tight seal. In the preferred embodiment the two sheets forming the envelope separator and the tube 15 each consists of e.g., polypropylene, so as to minimize bonding problems. As aforementioned, the two sheets 12 are either porous or can be perforated with tiny holes 17 so as to allow a controlled flow of an electrolytic solution through the pores of the sheets. If the sheets forming the envelope separator are perforated with tiny holes, it is preferred that the holes on each sheet not align in order to increase the turbulence caused by the electrolyte passing through the sheets and against the battery plates.

Figure 2:
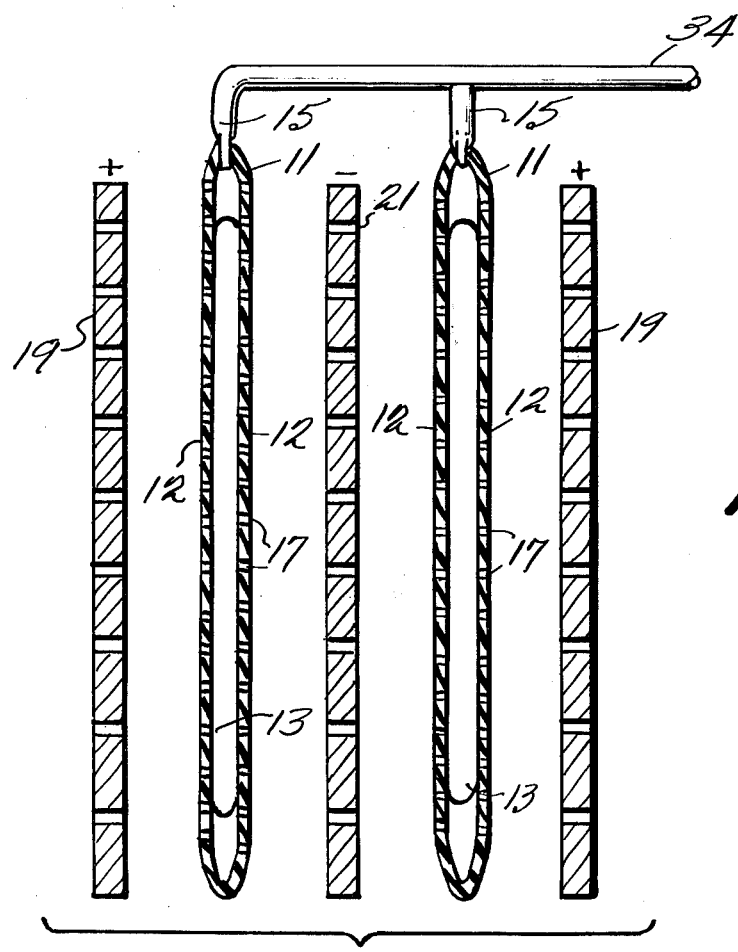
FIG. 2 is a partial section view of the battery of this invention showing an exaggerated view of the envelope separator.

Refer now to FIG. 2 where there is shown a partial section view not to scale of the battery of this invention having a plurality of envelope separators positioned between battery plates. For the sake of clarity, the complete battery, including the respective electrical connections of the positive and negative plates, are not illustrated in the drawing, since these battery features are well known in the art. Positive battery plates 19 each have a negative battery plate 21 positioned proximate thereto. The plates are aligned with their planes parallel to one another in order to provide a maximum surface area over which the electrolyte of the battery can make contact with the plates. Shown somewhat exaggerated in size for the sake of clarity are a plurality of separator envelopes 11 positioned between each of the battery plates. The envelopes each have a plurality of ribs 13 therein which provide a slight separation between the sheets 12 of the separator envelope. An electrolytic solution is forced under pressure through main conduit 34, through tubes 15 into each of the envelopes. The pressurized electrolyte is then forced through the pores or perforations 17 in the sheets 12 on each side of the envelope. While there is a substantial pressure drop across the sheets 11 of the envelope, there is still enough force in the electrolyte to flush out unwanted materials which may form on the surface of the plates 19 and 21, such as, for example, gases, loose particles of active material, water, etc. Because of this flushing action, the electrolytic solution is always in contact with substantially the entire surface area of each of the plates. In addition, by forcing the electrolyte against the plates of the battery, the concentration or specific gravity of the electrolyte at the surface and in the pores of the battery plates is substantially increased.

To further increase the efficiency of the present battery system, a plurality of holes 27 of relatively small size may be punched or drilled through the plates 19 and 21. The electrolyte is then forced into the holes 27 in the plates to further increase the electrochemical utilization of the active material of the plates because of the increased surface area of the plates.

Refer now to FIG. 3 where there is illustrated a cut-away perspective view of the battery system of this invention. A plurality of positive and negative battery plates, not shown for the sake of clarity, are positioned in casing 31 in a known manner. The plates are aligned with their planes parallel to one another and positioned between each of the plates is an envelope separator 11 such as illustrated in FIG. 2. The plates are submersed in an electrolytic bath such that the electrolyte completely covers the plates.

An electrolytic tank 32 is provided which supplies an electrolyte via lines 33 and 34 to the tubes 15 which lead into the respective envelope separators. If more than one battery is to be utilized in the propulsion system, line 33 extends onto each of the succeeding battery units. The electrolyte is pumped into the envelope separators by means of a compressor or pump 35 which can be mounted, for example, in the vehicle being powered by the battery. If mounted in the vehicle, the compressor or pump 35 can be run directly by an electrical motor 36 or any other suitable means known in the art. Recirculation line 37 is provided which conducts overflow electrolyte from the battery casing back to the electrolyte tank 32. The overflow line 37 extends into the battery casing 31 at a level slightly above the battery plates so that the electrolyte completely covers the battery plates.

If it should be desired to pump electrolyte into the battery only on an intermittent basis, an arrangement can be made for automatically causing the electrolyte tank 32 to pump the electrolyte at intervals. For example, the tank 32 can be activated by an appropriate control circuit 39 of conventional design to permit the electrolyte to enter the battery casing only when the electrolyte level in one or more of the batteries reaches a predetermined level as detected by a conventional detecting device 43 which is mounted within the battery casing 31.

The temperature of the electrolyte in the holding tank 32 and in the battery casing 31 can be appropriately monitored and adjusted by applying external heat or cooling to the tank. Thus refrigeration unit 41 detects the temperature of the electrolyte in the battery by means of a conventional temperature detector not shown and appropriately varies the temperature of the electrolyte in the holding tank 32 so that a predetermined electrolytic temperature level is attained. In order to accomplish this, a fluid is circulated from the refrigeration unit 41 to a heat exchange coil (not shown) in the electrolyte tank 32 and then back again to the refrigeration unit. Thus, in a cold climate where temperatures may drop as low as −50° Fahrenheit, the operation of the battery of this invention is not adversely affected.

By this invention a battery has been provided, which includes an envelope separator feature which not only provides for flushing the surface of the plates of the battery clear of residual materials such as water, gases or particles of active material, but also increases the concenration of electrolyte at the surface of the plates so that the efficiency of the battery can be substantially improved. By such an arrrangement the battery life is not adversely affected by a sudden excess demand on the battery such as might occur when utilized to power a car during acceleration thereof. In addition, because the battery plates are kept clear of residual particles which ordinarily insulate the battery plates from the electrolyte, the efficiency of the battery is substantially improved thereby rendering it possible to derive substantially more power and energy from the same size battery then has been heretofore known in the past.

It should be understood that while the present invention was described in connection with a preferred embodiment, other embodiments and equivalents thereof could be utilized which are in keeping with the spirit and scope of the invention as defined by the following appended claims.

What is claimed is:

1. An improved rechargeable battery system for an electrically powered vehicle including a battery casing, a plurality of battery plates positioned in said casing in parallel spaced relationship with one another and an electrolyte positioned in said casing and covering said battery plates, the improvement comprising:

a plurality of envelope separators, each having a plurality of small openings therein for permitting the ingress and egress of said electrolyte with respect thereto and a tube communicating with a source of electrolyte, said envelope separators being positioned between and in substantially parallel spaced relationship with said battery plates, said envelope separators having a surface area extending over substantially the entire surface of said battery plates, and means for forcing said electrolyte from the inside of said envelope separators outwardly through said openings toward the surfaces of said battery plates, said electrolyte being in contact with substantially the entire area of said battery plates and flushing away waste products positioned proximate said battery plates and increasing the concentration of electrolyte at the surface of said battery plates, whereby the efficiency of said rechargeable battery system for an electrically powered vehicle is improved.

2. The improved battery system of claim 1 wherein each envelope separator comprises a pair of sheets of microporous material, said sheets being bonded together at their ends to form an envelope separator and means for conducting said electrolyte under pressure into the interior of said envelope separator.

3. The improved battery system of claim 1 wherein each envelope separator comprises a pair of sheets of material each having a plurality of small holes therethrough, said sheets being bonded together at their ends to form an envelope separator and means for conducting said electrolyte under pressure into the interior of said envelope separator.

4. The improved battery system of claim 1 wherein said means for forcing said electrolyte through said envelope separator comprises:

an electrolyte tank positioned externally of said battery casing, means for pressurizing said electrolyte in said tank for delivery to said envelopes and control means for controlling operation of said pressurizing means.

5. The improved battery system of claim 1, including a plurality of said envelope separators positioned between and in one-to-one and parallel spaced relationship with said plurality of battery plates.

6. The improved battery system of claim 2 further comprising means for separating said sheets of microporous material internally of said ends.

7. The improved battery system of claim 6 wherein said sheets of microporous material consists of polypropylene.

8. The improved battery system of claim 3 further comprising means for separating said sheets of microporous material internally of said ends.

9. The improved battery system of claim 4 further comprising means for regulating the temperature of said electrolyte.

10. In a rechargeable battery system for an electrically powered vehicle including a battery casing, a plurality of battery plates positioned in said casing in parallel spaced relationship with one another and an electrolyte positioned in said casing and covering said plates, a method of improving the efficiency of said battery comprising the steps of:

generating a pressurized electrolyte, and distributing said pressurized electrolyte over substantially the entire surface area of said plates to flush away waste products positioned proximate said battery plates and to increase the concentration of electrolyte at the surfaces of said battery plates, wherein said distributing step further comprising the steps of forcing said pressurized electrolyte into a plurality of envelope separators positioned between and in parallel spaced relationship with said plates, said envelope separators having a surface area extending over substantially the entire surface area of said plates and having a plurality of small openings therein for permitting the ingress and egress of electrolyte and a tube communicating with a source of electrolyte, and flushing said pressurized electrolyte from the inside of said envelope separators outwardly through said openings toward the surface of said battery plates, said electrolyte being in contact with substantially the entire area of said battery plates and flushing away waste products positioned proximate said battery plates and increasing the concentration of electrolyte at the surface of said battery plates, whereby the efficiency of said rechargeable battery system for an electrically powered vehicle is improved.

11. The method of improving the efficiency of a rechargeable battery system of claim 10, including a plurality of said envelope separators positioned between and in one-to-one and parallel spaced relationship with said plurality of battery plates, as illustrated in FIG. 2.

12. The method of improving the efficiency of a rechargeable battery system of claim 10, including forming said envelope separators by bonding a pair of sheets of microporous material together at their ends to form an envelope separator.

13. The method of improving the efficiency of a rechargeable battery system of claim 10, including regulating the temperature of said electrolyte.

14. The method of improving the efficiency of a rechargeable battery system of claim 12, further including forming said envelope separator with means for separating said sheets of microporous material internally of said ends.

15. An envelope separator for use in an improved rechargeable battery system for an electrically powered vehicle including a battery casing, a plurality of battery plates positioned in said casing in parallel spaced relationship with one another, said envelope separator capable of being positioned between and in substantially parallel spaced relationship with said battery plates, and an electrolyte positioned in said battery casing and covering said battery plates, said envelope separator comprising:

an envelope having a plurality of small openings therein for permitting the ingress and egress of said electrolyte with respect thereto, and a tube adapted to communicate with a source of pressurized electrolyte, said envelope being adapted to force said electrolyte from the inside of said envelope through said openings outwardly toward the surface of said battery plates, said electrolyte being adapted to flush away waste products positioned proximate the entire area of said battery plates and increasing the concentration of electrolyte at the surface of said battery plates, whereby the efficiency of said rechargeable battery system for an electrically powered vehicle is improved.

16. An improved rechargeable battery system for an electrically powered vehicle including a battery casing, a plurality of battery plates positioned in said casing in parallel spaced relationship with one another and adapted for use with an electrolyte positioned in said casing and covering said battery plates, the improvement comprising:

a plurality of envelope separators, each having a plurality of small openings therein for permitting the ingress and egress of said electrolyte with respect thereto and a tube communicating with a source of electrolyte, said envelope separators being positioned between and in substantially parallel spaced relationship with said battery plates, said envelope separators having a surface area extending over substantially the entire surface of said battery plates, and means for forcing said electrolyte from the inside of said envelope separators outwardly through said openings toward the surface of said battery plates, said electrolyte being in contact with substantially the entire area of said battery plates and flushing away waste products positioned proximate said battery plates and increasing the concentration of electrolyte at the surface of said battery plates, whereby the efficiency of said rechargeable battery system for an electrically powered vehicle is improved.

17. The improved battery system of claim 16 including a plurality of envelope separators positioned between and in one-to-one and parallel spaced relationship with said plurality of battery plates.

* * * * *